Patented Aug. 26, 1924.

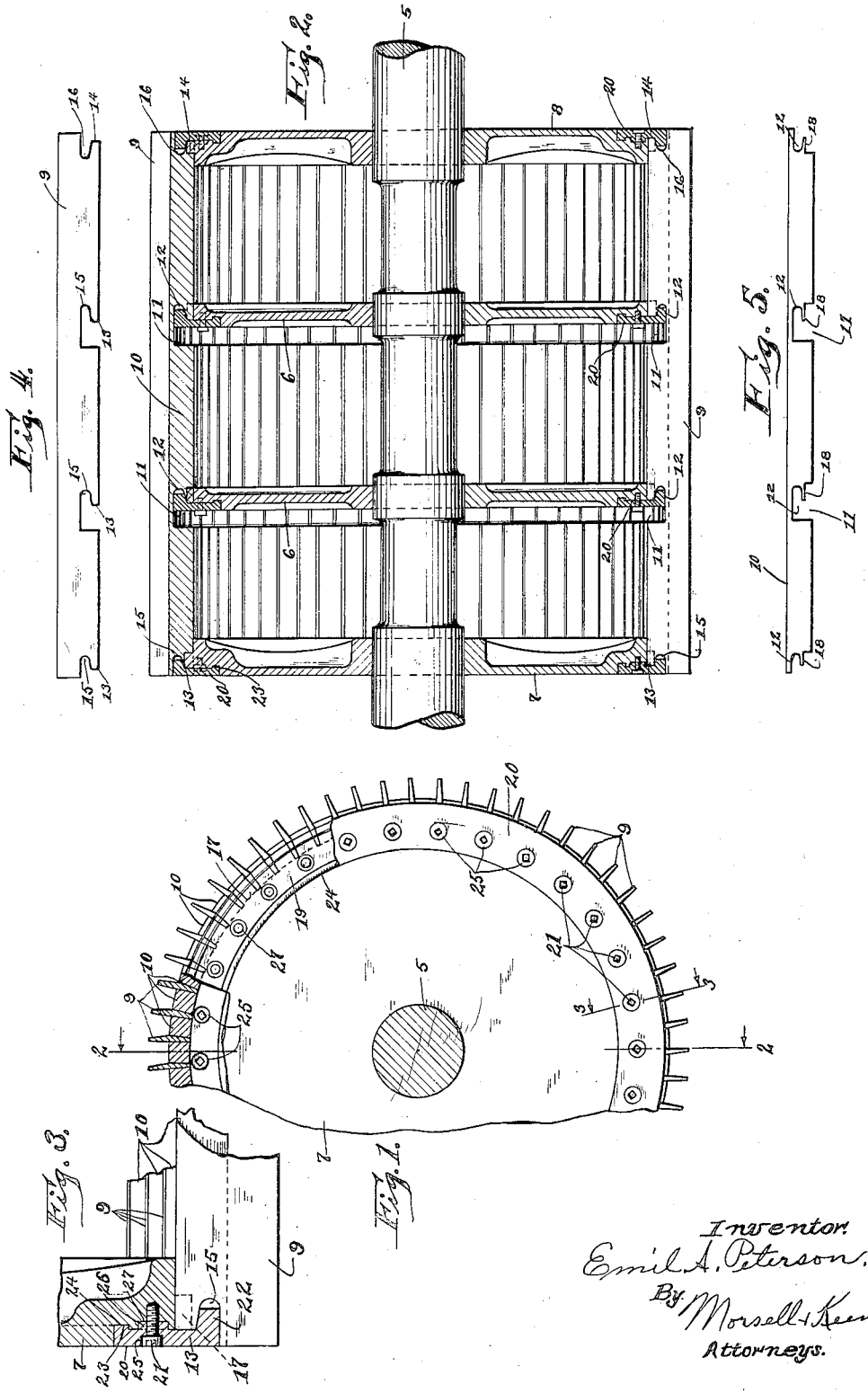

1,506,133

UNITED STATES PATENT OFFICE.

EMIL A. PETERSON, OF APPLETON, WISCONSIN.

ROLL OR ROTOR.

Application filed October 22, 1919. Serial No. 332,437.

*To all whom it may concern:*

Be it known that I, EMIL A. PETERSON, a citizen of the United States, and resident of Appleton, in the county of Outagamie and State of Wisconsin, have invented new and useful Improvements in Rolls or Rotors, of which the following is a description, reference being had to the accompanying drawings, which are a part of this specification.

The present invention relates to certain new and useful improvements in rolls or rotors for beating, bleaching and washing machines, and has for its primary object to provide what may be generally termed a bandless roll or rotor.

Rolls or rotors usually comprise a frame or drum, a plurality of longitudinally disposed spaced apart fly or knife bars projecting radially from the periphery of the frame or drum, and means for securing the fly or knife bars to the drum. Heretofore it has been the practice to secure the fly or knife bars to the frame or drum by means of two rings or bands disposed adjacent the ends of the frame or drum and secured thereto by heating and then shrinking them in place.

This method of securing the fly or knife bars in place, while securely maintaining the bars in position, does not permit of the ready interchanging or renewing of the bars, and to replace the bars it is necessary to cut the rings or bands and then provide entirely new ones. Hence with these and other inherent objections in mind, my invention has for another object to provide a bandless roll or rotor having means for readily interchangeably securing the fly or knife bars in position on the roll frame or drum.

A further object of my invention is to provide a fly or knife bar for a beating, bleaching and washing machine roll or rotor having a plurality of offset locking recesses adapted to have a readily removable interlocking engagement with the frame or drum of a roll or rotor.

A still further object of this invention is to provide a spacing member for fly or knife bars of the class described which will have a readily interchangeable interlocking engagement with the roll or rotor frame or drum.

With the above and other objects in view which will appear as the description proceeds my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Fig. 1 is an end view of a portion of a roll or rotor embodying the features of my invention, parts being broken away to more clearly illustrate its novel construction.

Fig. 2 is a longitudinal sectional view taken on the line 2—2 of Figure 1.

Fig. 3 is an enlarged fragmentary sectional view taken on the line 3—3 of Figure 1.

Fig. 4 is a side view of a fly or knife bar detached from the roll or rotor, and Fig. 5 is a side view of a spacing member detached.

Referring now more particularly to the accompanying drawing, the roll or rotor may be said to broadly consist of a frame or drum comprising a supporting shaft 5, inner collar members or flanges 6, and two end collar members or flanges 7 and 8; a plurality of fly or knife bars 9, spacing members 10 for retaining each adjacent pair of bars 9 in spaced relation; and means for readily removably securing the fly or knife bars 9 and the spacing members 10 in interlocking connection with the roll frame or drum.

Each fly or knife bar 9 and spacing member 10 has two intermediate recesses or notches 11 communicating with the inner longitudinal edge thereof and with offset locking recesses 12 extending to the right thereof with reference to Figures 2 and 4, and two end notches 13 and 14 communicating with the ends and inner longitudinal edge thereof and with offset locking recesses 15 and 16, respectively.

The members 6, 6, 7, and 8 are provided with a series of spacing and reinforcing lugs 17 on their peripheries between which the fly or knife bars 9 are nested, the spacing members 10 being provided with notched recesses 18, in their inner peripheral edges adjacent the recesses 11 for engagement with said lugs 17. This structure substantially reinforces the fly or knife bars 9 and prevents their slippage, with the spacing members 10, around the roll or rotor frame or drum.

The members 6, 6, 7, and 8 each have in one side face thereof, adjacent their outer periphery, an annular recess 19 in which fits a retaining ring or flange member 20, secured in place by binding bolts 21. As best shown in Figures 2 and 3, the members 20 have a laterally projecting annular rib 22 at their peripheries for interlocking engagement in the offset recesses, 12, 12, 15, and 16 of the bars 9 and spacing members 10, the outer portion of the members 20, projecting through the recesses 11, 11, 13, and 14.

As best shown in Figure 2, the ribs 22 of the members 20, secured to the collar members 6, 6, and 7 project in one direction and the rib 22 of the member 20, secured to the collar member 8 in a reverse direction. This structure permits the insertion or removal of one or more bars 9 or spacing members 10 by removing the member 20 carried by the collar member 8, by reason of the offset of the recesses 12, 12, and 15 being opposed to the recesses 14. The recesses 11 are sufficiently wide to allow the lateral movement of the bars 9 and spacing members 10, when the member 20 of the collar 8 is removed to permit the disengagement of the recesses 12, 12, and 15 from the ribs 22.

To reinforce the union between the members 20 and the collar members 6, 6, 7, and 8, the members 20 are formed with inner annular ribs 23 adapted to have snug engagement in annular grooves 24 at the inner extremities of the recesses 19.

The rounded heads of bolts 21 securing the rings or bands 20 to the members 7 and 8 are set in recesses 25 in the rings 20 to be flush with the outer face of the end member, so that the ends of the rotor or roll will present an unbroken surface. The recesses for receiving the rounded heads of the bolts 21 are surrounded with bosses 26, on the inner faces of the said rings, which engage in recesses 27 in the members 7 and 8, whereby the end rings 20 will not be weakened by the recesses therein.

From the foregoing description taken in connection with the accompanying drawing, it will be at once apparent to those skilled in the art to which an invention of this character appertains, that I provide a roll or rotor having readily removable fly or knife bars and spacing members.

What I claim as my invention is:

1. A roll of the class described comprising a roll frame having spaced intermediate and end collars; a plurality of recessed knife bars; rings readily detachably carried by said intermediate collars engaging recesses of said bars; and means carried by one of said end collars for preventing the disengagement of said bars from said rings.

2. A roll for beaters, bleachers, washers, and the like, comprising a roll frame having spaced intermediate and end collars; a plurality of longitudinally extending knife bars provided with intermediate and end recesses; spacing members positioned between adjacent knife bars, also provided with intermediate and end recesses; rings readily detachably carried by said intermediate collars engaging the intermediate recesses of said bars and spacing members; a ring member carried by one of said end collars, engaging said end recesses, for preventing longitudinal movement of said bars and members in one direction; and fastening means for readily detachably securing said last named ring member to said end collar.

3. A device of the class described, comprising a roll frame including a shaft and a plurality of collar members fixed thereto in spaced relation, a plurality of knife bars, interlocking connections between the knife bars and collar members, a retaining ring, and fastening means readily removably securing said ring to the frame to secure the knife bars in said interlocking connection with the collar members.

4. A device of the class described, comprising a roll frame including a shaft and a plurality of collar members fixed thereto in spaced relation, a plurality of knife bars, interlocking connections between the knife bars and collar members, spacing members positioned between adjacent knife bars, interlocking connections between the spacing members and collar members, an annular ring for retaining said knife bars and spacing members in interlocking connection with the collar members, and means readily detachably securing said annular ring in position on the frame.

In testimony whereof, I affix my signature.

EMIL A. PETERSON.